(12) United States Patent
Faasse

(10) Patent No.: US 10,877,548 B2
(45) Date of Patent: Dec. 29, 2020

(54) CONTEXT SWITCHES WITH PROCESSOR PERFORMANCE STATES

(71) Applicant: Hewlett Packard Enterprise Development LP, Houston, TX (US)

(72) Inventor: Scott Faasse, Houston, TX (US)

(73) Assignee: Hewlett Packard Enterprise Development LP, Houston, TX (US)

(*) Notice: Subject to any disclaimer, the term of this patent is extended or adjusted under 35 U.S.C. 154(b) by 247 days.

(21) Appl. No.: 15/916,894

(22) Filed: Mar. 9, 2018

(65) Prior Publication Data

US 2019/0278355 A1 Sep. 12, 2019

(51) Int. Cl.
| | |
|---|---|
| *G06F 1/32* | (2019.01) |
| *G06F 1/3234* | (2019.01) |
| *G06F 1/3228* | (2019.01) |
| *G06F 9/46* | (2006.01) |
| *G06F 9/455* | (2018.01) |
| *G06F 9/50* | (2006.01) |
| *G06F 9/38* | (2018.01) |

(52) U.S. Cl.
CPC .......... *G06F 1/3234* (2013.01); *G06F 1/3228* (2013.01); *G06F 9/45558* (2013.01); *G06F 9/463* (2013.01); *G06F 9/5094* (2013.01); *G06F 9/3842* (2013.01); *G06F 2009/45579* (2013.01)

(58) Field of Classification Search
CPC ..................................... G06F 1/32; G06F 9/44
See application file for complete search history.

(56) References Cited

U.S. PATENT DOCUMENTS

| | | | | |
|---|---|---|---|---|
| 2009/0172367 | A1* | 7/2009 | Yoshida | G06F 9/30101 712/225 |
| 2009/0307708 | A1* | 12/2009 | Archer | G06F 9/4893 718/108 |
| 2013/0263114 | A1* | 10/2013 | Watkins | G06F 9/45558 718/1 |
| 2018/0060123 | A1* | 3/2018 | Weissmann | G06F 9/4893 |

\* cited by examiner

*Primary Examiner* — Keshab R Pandey
(74) *Attorney, Agent, or Firm* — Park, Vaughan, Fleming & Dowler LLP

(57) ABSTRACT

In example implementations, an apparatus is provided. The apparatus includes a context switch block, a processor performance state block, and a task execution block. The context switch block is to perform a context switch. The processor performance state block is to load a processor with a processor performance state stored in a context information associated with a task. The task execution block is to execute the task with the processor operating at the processor performance state loaded from the context information.

15 Claims, 4 Drawing Sheets

CONTEXT SWITCHES WITH PROCESSOR PERFORMANCE STATES

BACKGROUND

Processors are used in computing devices to execute instructions stored in memory, such as software applications. The processors can read instructions stored in memory and perform tasks or operations on information, data, and the like, in accordance with the instructions. Processors can be designed to execute parallel instructions to improve performance. In other words, processors can execute instructions associate with multiple different software applications simultaneously.

The design of processors has improved such that processors can include multiple cores to improve processing speeds. Thus, processors can execute larger applications more quickly and more efficiently.

DETAILED DESCRIPTION

Examples described herein provide an apparatus and method for performing context switches with processor performance states (P-states). As discussed above, processors can be designed to execute multiple tasks or applications. In some instances, the tasks can be run simultaneously by multiple processors or different cores within the processor.

In other instances, the processor may be designed to share processing resources across multiple different tasks. In other words, the different tasks can be executed simultaneously. However, the processor may execute a task one at a time. Said another way, the execution of the tasks can be time divided on the processor.

In some examples, the processor may have multiple cores. Thus, execution of the different tasks may be time divided onto different cores of the processor. In some examples, multiple processors may be available in a virtualized environment. Thus, the execution of the different tasks may be time divided onto different processors.

In the examples above, when the task is time divided onto a processor, the processor may perform a context switch where the processor stops executing one task and begins executing a different task. The context switch allows the processor to save and restore the state of the processor's resources at the time of the context switch between the two tasks.

Management software may monitor the context switching of the processor or processors. When the management software observers low utilization of the processor, the management software may change the P-state of the processor. However, some tasks may want the processor operating at a certain P-state for execution of the task. Thus, if the management software changes the P-state, some tasks may not be executed with the processor operating at the optimal P-state.

In another example, the management software may observe the utilization of the processor and realize that the task should be executed while the processor is operating at a higher P-state. However, there may be a delay to "ramp up" the P-state of the processor after the processor has begun executing the task.

Examples of the present disclosure provide that the P-state is included in the context information that is saved and restored to ensure that the tasks are executed with the processor operating at the correct P-state. In addition, providing the P-state in the context information may eliminate time delays from "ramping up" the P-state of the processor. The P-state may be read by the processor from the context information associated with a task when a context switch is performed. As a result, the processor may immediately know which P-state to operate at while executing the task.

Figure 1:
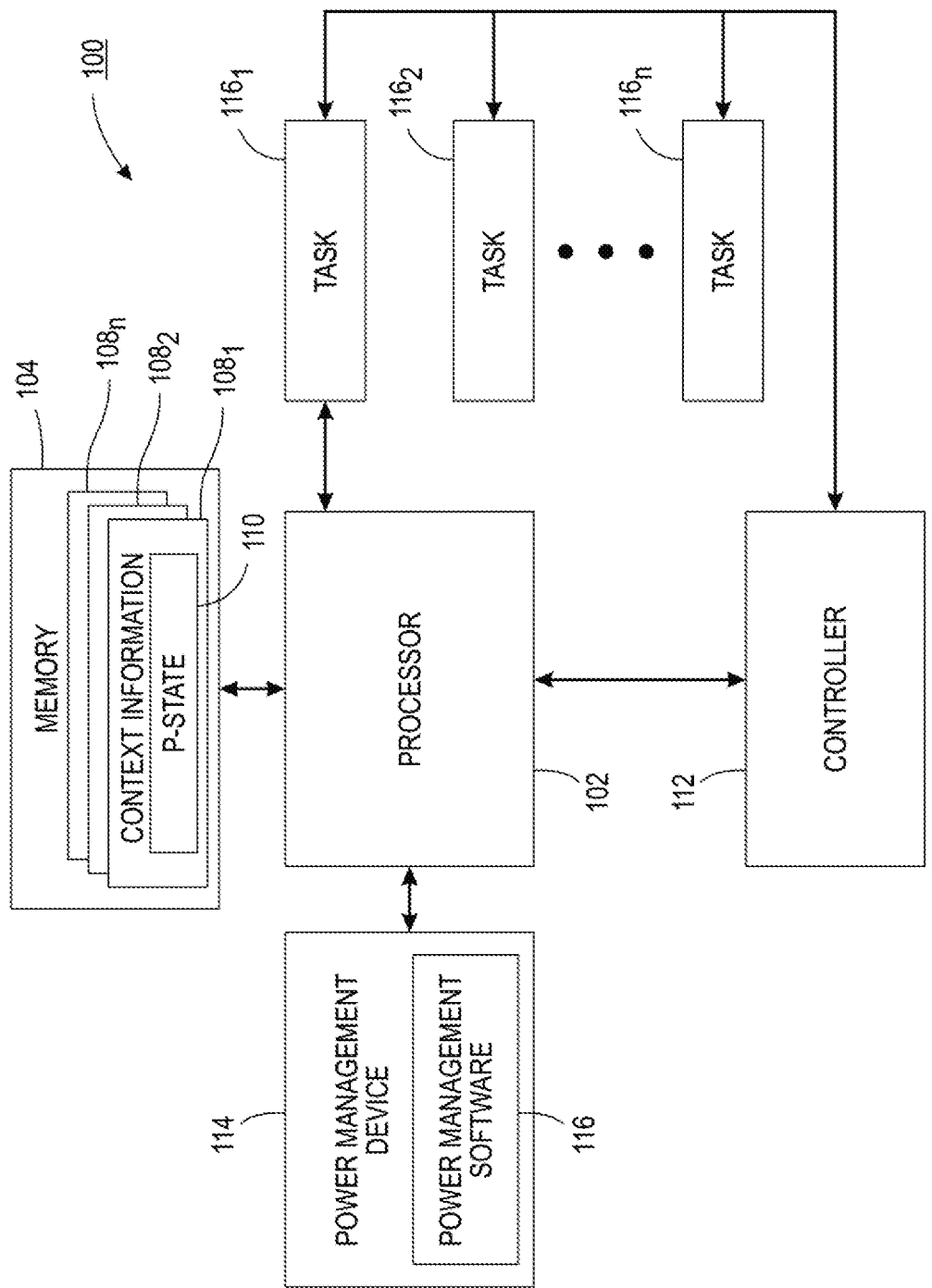
FIG. 1 is a block diagram of an example computing device that performs context switches with processor performance states of the present disclosure.

FIG. 1 illustrates an example computing device 100 of the present disclosure. The computing device 100 may include a processor 102. In one example, the processor 102 may be an x86 processor that is part of a desktop computer or a laptop computer. In another example, the processor 102 may be deployed as a plurality of processors 102. For example, the plurality of processors 102 may be part of a server farm that provides a virtualization environment. The processors 102 may be operated to form virtualized machines, and the like.

In one example, the processor 102 may be a multiple core processor. In other words, the processor 102 may include two or more independent processing units that each have a respective cache and can read and execute program instructions.

In one example, the computing device 100 may also include a memory 104, a controller 112, and a power management device 114. It should be noted that the computing device 100 has been simplified for ease of explanation. In other words, the computing device 100 may include additional components that are not shown, such as for example, an input/output interface, graphical processors, display interfaces, a power source, and the like.

In one example, the controller 112 may be a hardware controller or implemented in software to manage execution of tasks $106_1$ to $106_n$ (hereinafter referred to individually as a task 106 or collectively as tasks 106) by the processor 102. The task 106 may be an application, a command line, an entire virtualized machine, or any other executable instruction. The controller 112 may be an operating system of the computing device 100, a hypervisor of a virtualized environment, a virtual machine management module, and the like The controller 112 may manage a sequence that the tasks 106 are executed by the processor 102 and the timing of the context switching between tasks 106. As discussed above, the execution of the task 106 may be time divided to be executed by the processor 102. The tasks 106 may be stored in memory. The memory may be the memory 104 or a different computer readable memory of the computing device 100.

In one example, the controller 112 may send a signal or a notification to the processor 102 to perform a context switch when tasks 106 are changed. A context switch may be a process of storing a state of a process or of a thread so that it can be restored and execution of the processor may resume from the same point later. This may allow multiple processes to share a processor 102. Context switching may be a feature for multitasking in an operating system.

The context switch may cause the processor 102 to stop executing a current task 106 and store context information (e.g., the state of the processor or the thread, and additional relevant data) for the current task 106 that is being executed. The processor 102 may restore the context information for a new task 106 to prepare for execution of the new task 106 that will be executed. The processor 102 may then start execution of the new task 106. Many context switches may occur in a short period of time.

In one example, the context information $108_1$ to $108_n$ (hereinafter referred to individually or collectively as context information 108) may be stored in the memory 104. The memory 104 may be a random access memory (RAM) of the computing device 100, non-volatile memory (NVM) of the processor 102, an external cache, an internal cache, and the like. The type of memory 104 may depend on a design architecture of the processor 102 and the computing device 100 overall.

In one example, the context information 108 may be associated with a task 106. For example, the context information $108_1$ may be associated with the task $106_1$, the context information $108_2$ may be associated with the task $106_2$, and so forth. The context information 108 may include the state of the process or of a thread, as discussed above, and the relevant associated information. For example, the information may include data, addresses, values stored in registers, and the like, during execution of the task 106 up to a point in time when the task 106 was interrupted. In one example, the context information 108 may be include information associated with an entire virtualized machine. The context information 108 may allow the processor 102 to resume executing the task 106 at a later time in an efficient manner.

In one example, the present disclosure may add a P-state 110 to the context information 108. In other words, each context information 108 may have a respective P-state 110 for the associated task 106. The P-state 110 may be read and loaded by the processor 102. As a result, the processor 102 may execute the task 106 immediately with the correct P-state 110.

The P-state 110 may be a processor performance level as noted above. The processor performance level may specify a frequency and voltage combination for operating the processor 102. For example, the processor 102 may be controlled to operate at different frequencies ranging from the maximum frequency to any frequency that is lower than the maximum frequency of the processor 102. At lower frequencies, the processor 102 may operate at lower voltages and consume less power. Thus, adjusting the processor performance level may be used for power management (e.g., on battery operated laptop computers).

In one example, the power management device 114 may execute a power management software 116. The power management software 116 may be part of the basic input/output system (BIOS) of the computing device 100, the operating system of the computing device 100, the firmware of the computing device 100, and the like. The power management device 114 may be implemented in hardware that may include part of the processor 102, or another processor, and the memory 104, or another memory device of the computing device 100. In other words, the power management software 116 may be stored in memory and executed by the processor 102 or another processor component of the computing device 100.

The power management device 114 may monitor the utilization of the processor 102 periodically. Based on the monitored utilization of the processor 102, the power management device 114, via the power management software 116, may change the processor performance level of the processor 102. Thus, without the P-state 110 contained in the context information 108, the power management device 114 may change the performance level of the processor 102 to an undesirable level for some tasks 106. The P-state 110 may override the performance level for the processor 102 that may be set by the power management device 114 for a specific task 106.

In one example, the P-state 110 may supplement the operation of the power management device 114. For example, the power management device 114 may set a current processor performance level. If the current processor performance level is greater than the P-state 110 for a task 106, then the processor may continue to operate at the current processor performance level to execute the task 106. However, if the current processor performance level is lower than the P-state 110 for a task 106, then the P-state 110 may override the current processor performance level and load the P-state 110 to execute the task 106.

In one example, when the processor 102 receives a notification to perform a context switch, the processor 102 may stop execution of a current task $106_1$ and update the context information $108_1$ for the current task $106_1$. The processor 102 may store the updated context information $108_1$ in the memory 104 for later retrieval. The updated context information $108_1$ may include a current P-state of the processor 102 that may be stored as the P-state 110 in the context information $108_1$. The processor 102 may then obtain and restore the context information $108_2$ for the next task $106_2$ and load the P-state 110 contained in the context information $108_2$ and the relevant data in the context information $108_2$ to execute the next task $106_2$.

In another example, the context switch may switch the task $106_1$ from a first core in the processor 102 to a second core in the processor 102. The first core may be operating at a processor performance level as specified by the P-state 110 of the context information $108_1$ associated with the task $106_1$. However, the second core may be operating at a lower processor performance level. When the context switch is initiated, the second core may stop a current task $106_2$ and store the P-state 110 in the context information $108_2$. The second core may the read and restore the P-state 110 in the context information $108_1$ for the task $106_1$. As such, the second core may operate at the processor performance level associated with the P-state 110 immediately when the task $106_1$ is transferred from the first core to the second core. Thus, no delay may be experienced to "warm up" the second core to execute the task $106_1$.

In one example, the P-state 110 may be modified externally. For example, the power management device 114 may change the P-state 110 in the context information 108. To illustrate, the processor 102 may operate at a particular processor performance level that was initially loaded based on the P-state 110. However, it may be determined that a different processor performance level would improve execution of the task 106 based on observation. As a result, after the processor 102 stores the updated context information 108 with the P-state 110, the power management device 114 may modify the P-state 110 to a different processor performance level than was stored by the processor 102.

In some examples, the processor 102 may employ speculative branch prediction. In other words, the processor 102 may predict which task 106 may be called next by the controller 112. Based on the prediction, the processor 102 may read and load the P-state 110 from the context information 110 associated with the task 106 that the processor 102 has predicted to be called next. As a result, when the processor 102 receives the notification to perform the context switch to the next task 106, the processor 102 may have already loaded the correct processor performance level. The processor 102 may immediately start executing the next task 106 while operating at the correct processor performance level.

Figure 2:
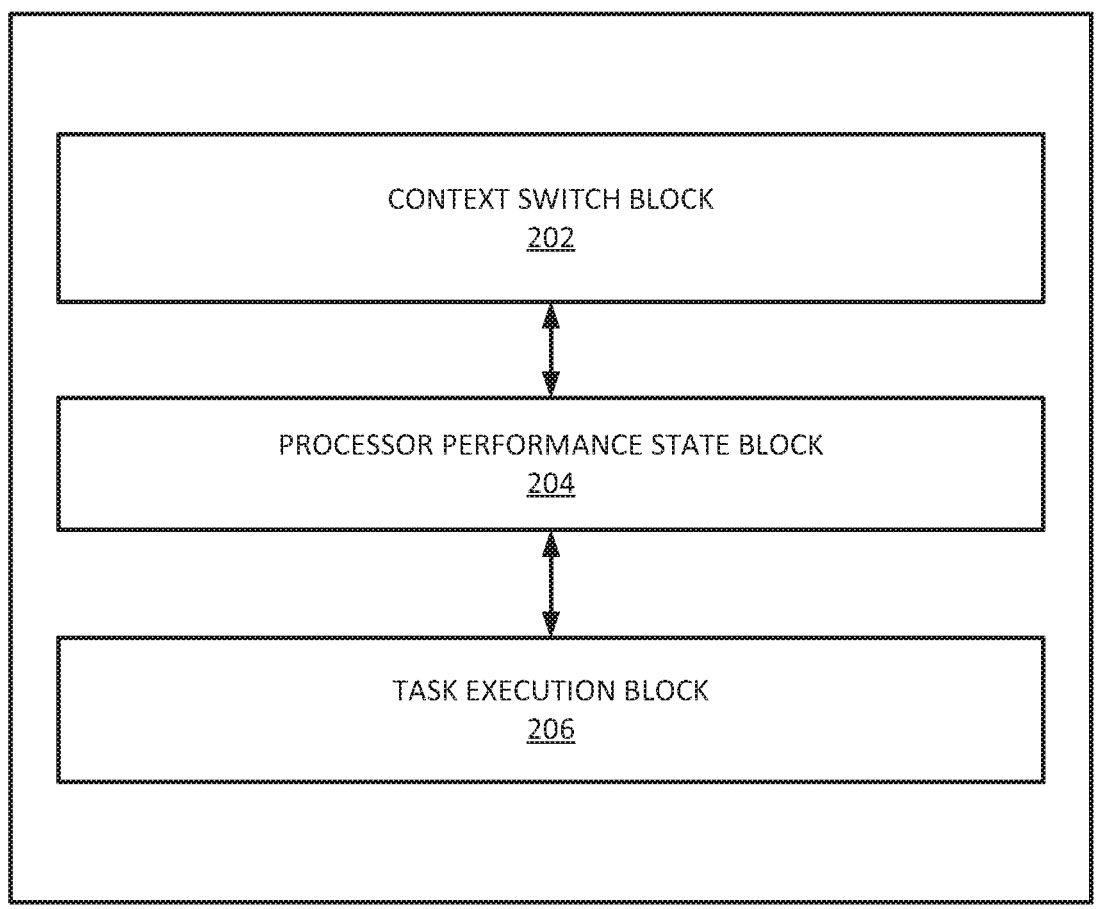
FIG. 2 is a block diagram of an example apparatus that performs context switches with processor performance states of the present disclosure.

FIG. 2 illustrates a block diagram of an example apparatus 200 that performs context switches with processor performance states of the present disclosure. In one example, the apparatus 200 may be the processor 102.

In one example, the apparatus 200 may include a context switch block 202, a processor performance state block 204, and a task execution block 206. The blocks 202, 204, and 206 may be configured in the processor 102 via logical blocks or via physical circuit design.

In one example, the context switch block 202 may be to perform a context switch. For example, a controller (e.g., the controller 102) may initiate a context switch to either move the task to another core or change the task that is executed by the processor 102.

In one example, the processor performance state block 204 may be to load the processor 102 with a processor performance state (e.g., P-state) stored in a context information associated with the task. For example, the P-state stored in the context information may be read and loaded to the processor 102 via the processor performance state block 204. As a result, the processor 102 may immediately begin operating at the processor performance level associated with the P-state.

In one example, the task execution block 206 may be to execute the task with the processor operating at the processor performance state loaded from the context information. As a result, no delay or ramp up time is experienced as the processor 102 may immediately begin operating at the processor performance level associated with the P-state read and loaded from the context information.

In one example, the context switch block 202 may also be to receive a signal to perform a subsequent context switch and to store a current processor performance state with an updated context information in response to the signal. In other words, when a subsequent context switch is initiated, the context switch block 202 may cause the processor 102 may update the context information with the current processor performance state. The updated context information may then be stored in memory for later retrieval.

The apparatus 200 may also include other components similar to the computing device 100. For example, the apparatus 200 may include a power management device executing a power management software. The power management device may monitor and set a current processor performance state of the processor. However, as described above, the processor performance state associated with the P-state stored in the context information may override the current processor performance state set by the power management device. The power management device may also be used to modify the P-state stored in the context information, as described above.

The apparatus 200 may also include the controller device to control the context switching performed by the context switch block 202. The apparatus 200 may also include other memory devices such as RAM, NVM, external caches, and the like to store the context information with the P-state.

Figure 3:
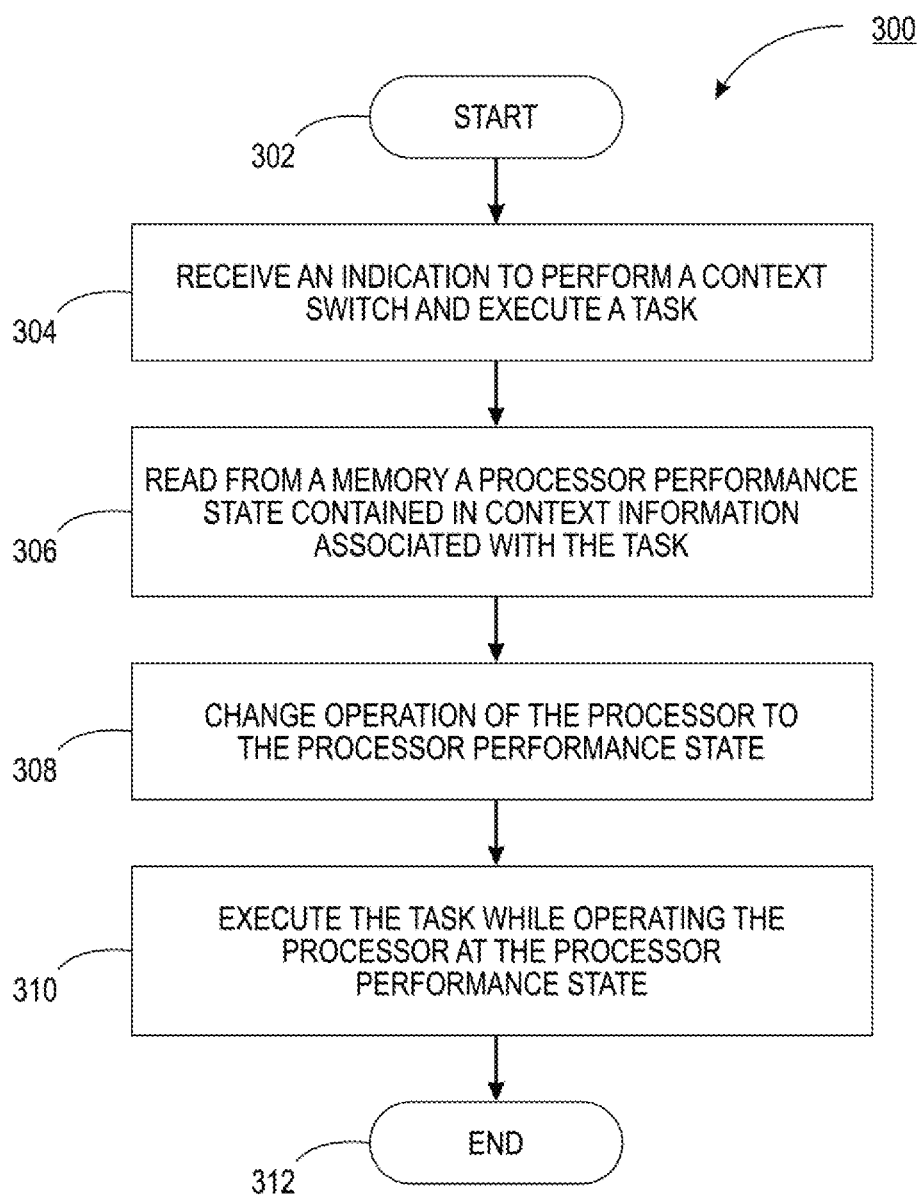
FIG. 3 is a flow chart of an example method for executing a task while operating a processor at a processor performance state read from a context information.

FIG. 3 illustrates a flow diagram of an example method 300 for executing a task while operating a processor at a processor performance state read from a context information. In an example, the method 300 may be performed by the computing device 100, the apparatus 200, or the apparatus 400 illustrated in FIG. 4 and described below.

At block 302, the method 300 begins. At block 304, the method 300 receives an indication to perform a context switch and execute a task. For example, the context switch may be initiated by a controller, such as a virtual machine manager or a hypervisor, to change the task being executed by a processor or move the task to another core in the processor.

At block 306, the method 300 reads from a memory a processor performance state contained in context information associated with the task. The processor may look up in memory the context information associated with the task. Within the context information may be the processor performance state, or P-state, associated with the task. The processor may read and load the P-state.

At block 308, the method 300 changes operation of the processor to the processor performance state. In one example, the processor performance state may be changed before the context switch occurs to change the task executed by the processor. For example, the processor may employ speculative branch prediction to predict the next task that will be executed. Based on the prediction, the processor may obtain the respective context information and P-state from memory.

At block 310, the method 300 executes the task while operating the processor at the processor performance state. As a result, no delay or ramp up time is experienced. Rather, the processor may immediately being operating at the P-state indicated in the context information to execute the task.

In one example, the method 300 may be repeated continuously for each context switch. For example, an indication to perform a subsequent context switch and execute a different task may be received. In response, the processor may store a current processor performance state with an updated context information. At a later time, when the processor is assigned to execute the task again, the P-state may be read and loaded from the updated context information and the processor may execute the task accordingly.

In one example, the P-state may be modified externally. For example, the P-state may be modified to a desired P-state. As noted above, the power management device may modify or change the P-state after the processor has stored the updated context information with the P-state. The P-state may be modified externally for a variety of different reasons, as discussed above. At block 312, the method 300 ends.

Figure 4:
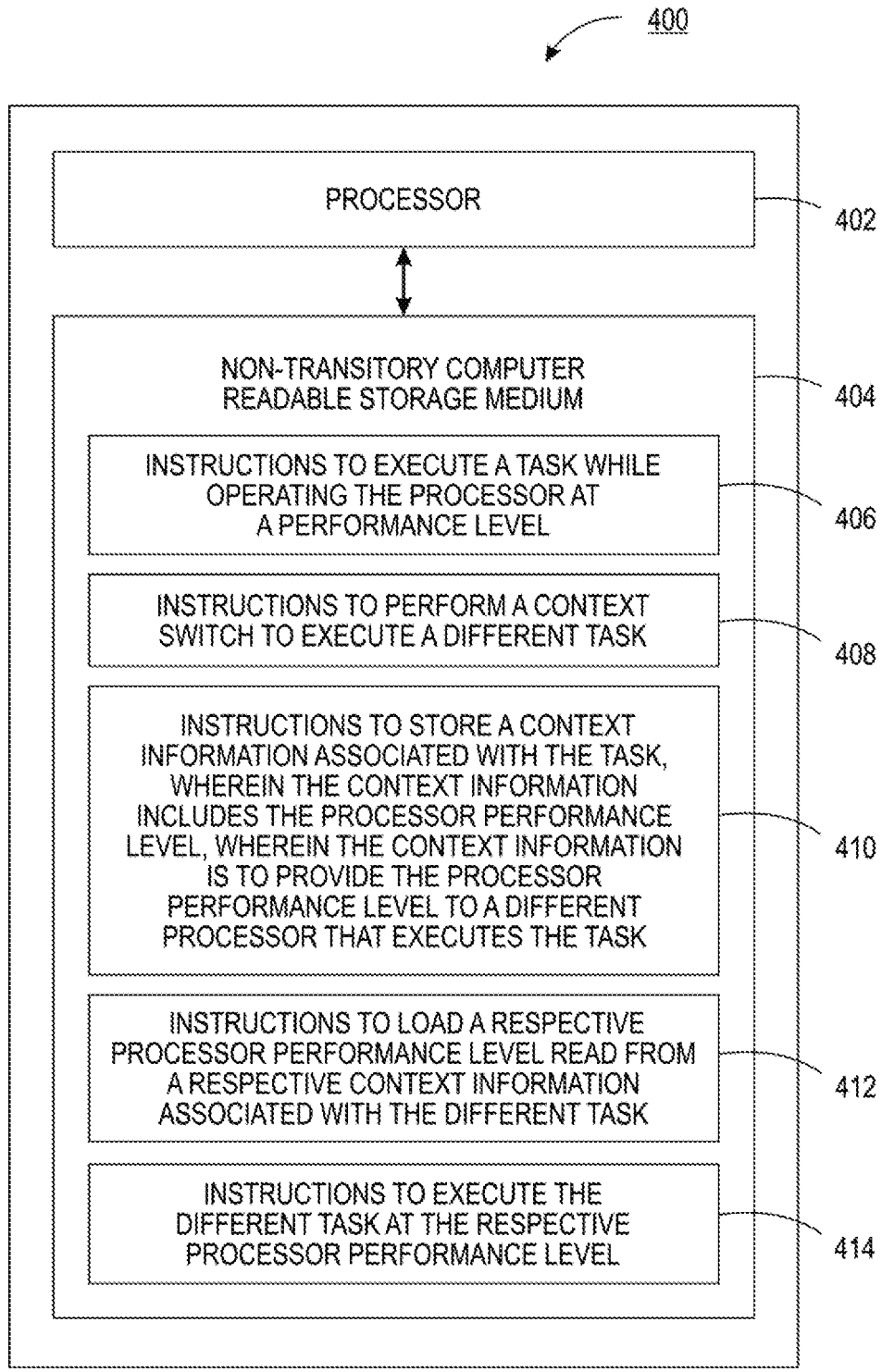
FIG. 4 is a block diagram of an example non-transitory computer readable storage medium storing instructions executed by a processor.

FIG. 4 illustrates an example of an apparatus 400. In an example, the apparatus 400 may be a computing device 100 illustrated in FIG. 1. In an example, the apparatus 400 may include a processor 402 and a non-transitory computer readable storage medium 404. The non-transitory computer readable storage medium 404 may include instructions 406, 408, 410, 412, and 414 that, when executed by the processor 402, cause the processor 402 to perform various functions.

In an example, the instructions 406 may include instructions to execute a task while operating the processor at a processor performance level. The instructions 408 may include instructions to perform a context switch to execute a different task. The instructions 410 may include instructions to store a context information associated with the task, wherein the context information includes the processor performance level, wherein the context information is to provide the processor performance level to a different processor that executes the task. The instructions 412 may include instructions to load a respective processor performance level read from a respective context information associated with the different task. The instructions 414 may include instructions to execute the different task at the respective processor performance level.

It will be appreciated that variants of the above-disclosed and other features and functions, or alternatives thereof, may be combined into many other different systems or applications. Various presently unforeseen or unanticipated alternatives, modifications, variations, or improvements therein may be subsequently made by those skilled in the art which are also intended to be encompassed by the following claims.

The invention claimed is:

1. A computer system, comprising:
a processor;
a context switch controller module coupled to the processor and configured to perform context switching in association with the processor, during which the processor is configured to switch from execution of a first task to execution of a second task;
a memory device coupled to the processor and configured to store a set of context information corresponding to the second task, wherein the context information is loaded during the context switching to avow the processor to execute the second task, and wherein the context information includes a processor performance state that indicates an operating frequency, an operating voltage, or both for the processor; and
a processor performance state module coupled to the processor and configured to place the processor in the processor performance state included in the context information;
wherein when a power management module coupled to the processor is configured to place the processor, according to a predetermined power-management plan, in a second performance state that is lower than the processor performance state included in the context information, the processor performance state module is further configured to override the power management module by placing the processor in the performance state included in the context information in association with the context switching instead of the performance state indicated by the predetermined power-management plan.

2. The computer system of claim 1, wherein the context information is stored in at least one of: a random access memory of the apparatus, a non-volatile memory of the processor, an external cache, or an internal cache.

3. The computer system of claim 1, wherein the context switch controller module is configured to receive a signal to perform a subsequent context switching and to store a current processor performance state with an updated context information in response to the signal to perform the subsequent context switching.

4. The computer system of claim 3, wherein the current processor performance state is modified externally by a power management device executing power management software.

5. A computer-executed method, comprising:
receiving, by a processor, an indication to perform context switching, during which the processor is configured to switch from execution of a first task to execution of a second task;
storing, by a memory device, a set of context information corresponding to the second task, wherein the context information is loaded during the context switching to allow the processor to execute the second task, and wherein the context information includes a processor performance state that indicates an operating frequency, an operating voltage, or both for the processor;
reading, by the processor, from the memory device, the processor performance state included in the context information associated with the second task;
changing, by the processor, operation of the processor to the processor performance state included in the context information associated with the second task;
executing, by the processor, the second task while operating the processor at the processor performance state; and
in response to determining, by the processor, that a power management module places the processor, according to a predetermined power-management plan, in a second performance state that is lower than the processor performance state included in the context information, overriding the power management module by placing the processor in the performance state included in the context information associated with the second task instead of the second performance state indicated by the predetermined power-management plan.

6. The method of claim 5, wherein the indication to perform the context switching is received from a virtual machine manager.

7. The method of claim 5, wherein the changing is performed before the context switching occurs.

8. The method of claim 5, further comprising:
receiving, by the processor, an indication to perform a subsequent context switching and execute a different task;
storing, by the processor, a current processor performance state with an updated context information in response to the indication to perform the subsequent context switching.

9. The method of claim 8, further comprising:
receiving, by the processor, an instruction to modify the current processor performance state to a desired processor performance state.

10. The method of claim 8, wherein the updated context information is stored in at least one of: a random access memory of the apparatus, a non-volatile memory of the processor, an external cache, and internal cache.

11. A non-transitory computer readable storage medium encoded with instructions executable by a processor, the non-transitory computer-readable storage medium comprising:
instructions to execute a first task while operating the processor at a processor performance level associated with the first task;
instructions to perform context switching, during which the processor is configured to switch from execution of the first task to execution of a second task;
instructions to store a set of context information corresponding to the second task, wherein the context information is loaded during the context switching to allow the processor to execute the second task, wherein the context information includes a processor performance level that indicates an operating frequency, an operating voltage, or both for the processor, wherein the context information is to provide the processor performance level to a different processor that executes the second task;

instructions to load the processor performance level included in the context information associated with the second task;

instructions to execute the second task at the processor performance level included in the context information; and instructions to, in response to determining, by the processor, that a power management module places the processor, according to a predetermined power-management plan, in a second performance level that is lower than the processor performance level included in the context information, override the power management module by placing the processor in the performance level included in the context information associated with the second task instead of the second performance state indicated by the predetermined power-management plan.

12. The non-transitory computer readable storage medium of claim 11, wherein the context information is stored in at least one of: a random access memory of the apparatus, a non-volatile memory of the processor, an external cache, or an internal cache.

13. The non-transitory computer readable storage medium of claim 11, wherein computing resources of the processor and the different processor are shared as part of a virtualized machine.

14. The non-transitory computer readable storage medium of claim 11, further comprising:

instructions to modify the processor performance level.

15. The non-transitory computer readable storage medium of claim 11, further comprising:

instructions to predict the context switching to the second task; and instructions to load the processor performance level before the context switching is performed.

* * * * *